United States Patent Office 2,731,098
Patented Jan. 17, 1956

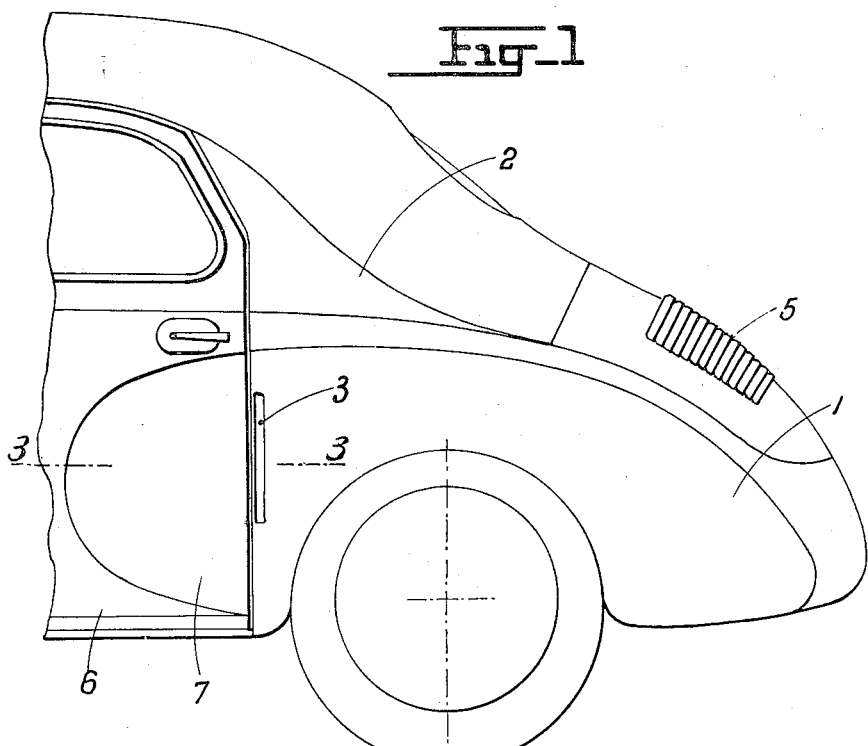
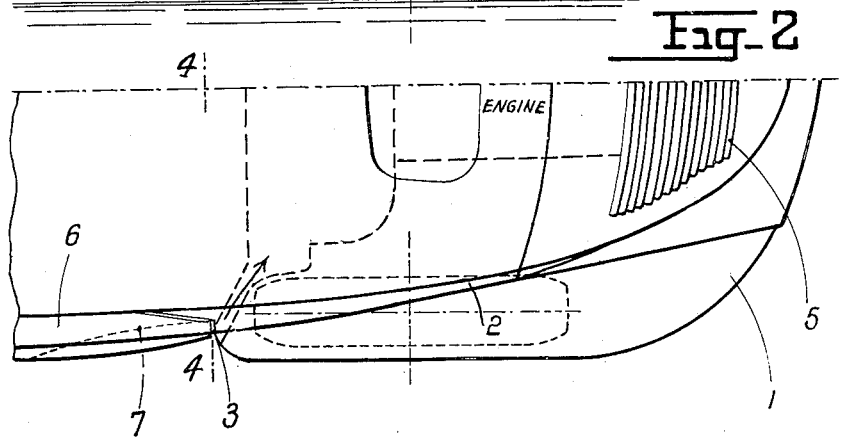
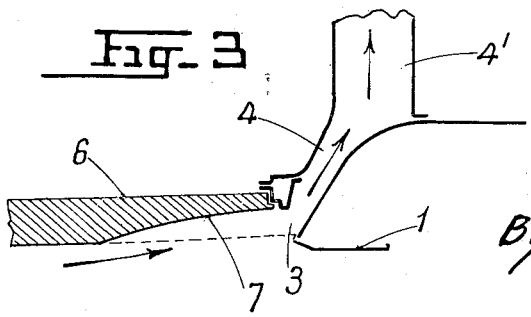

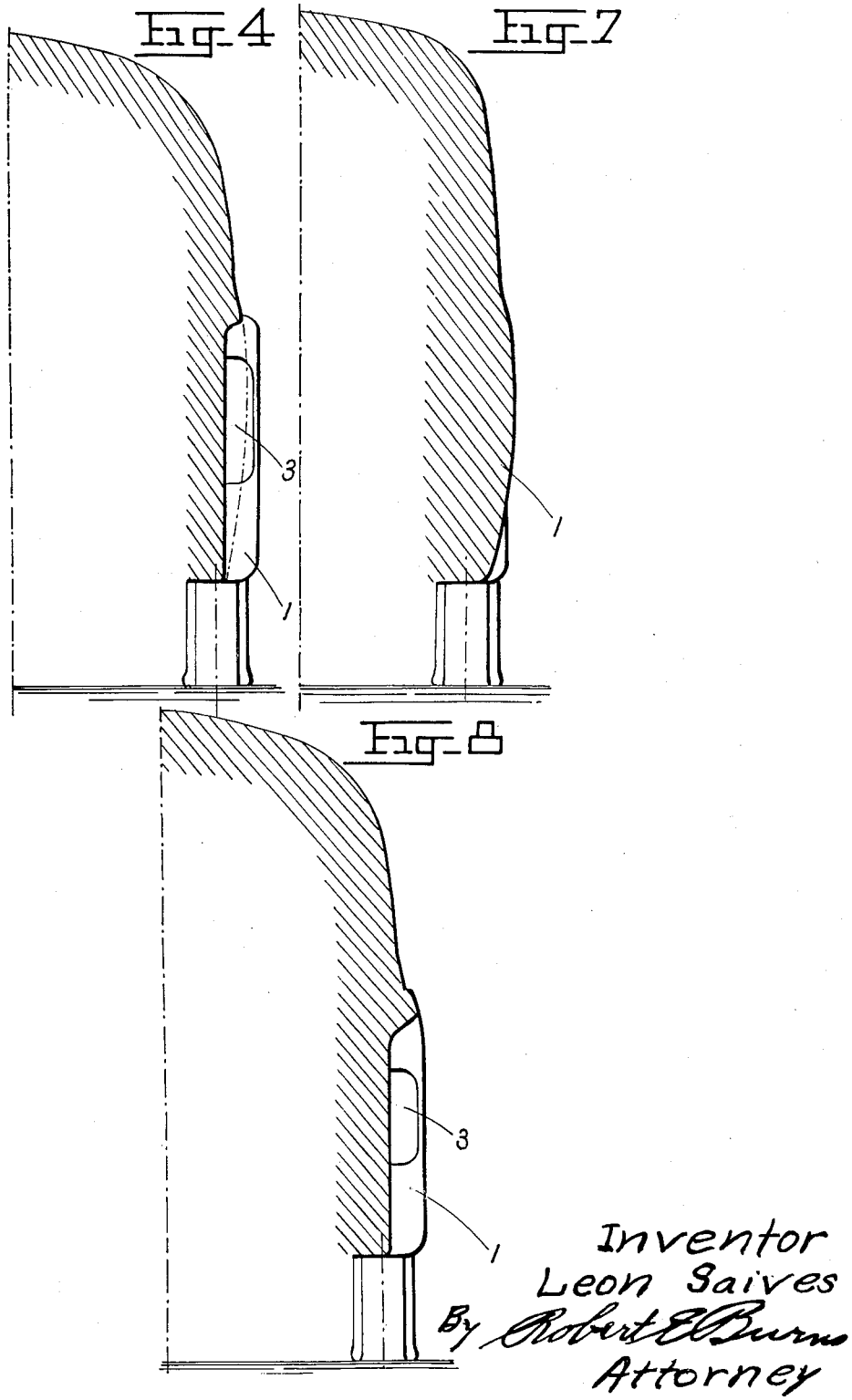

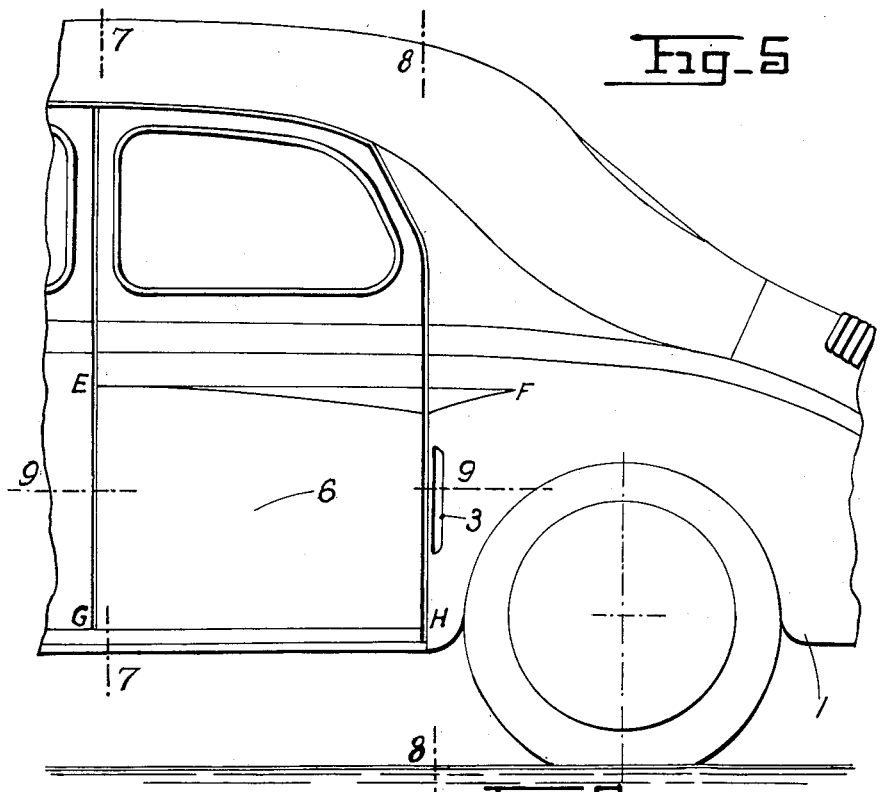
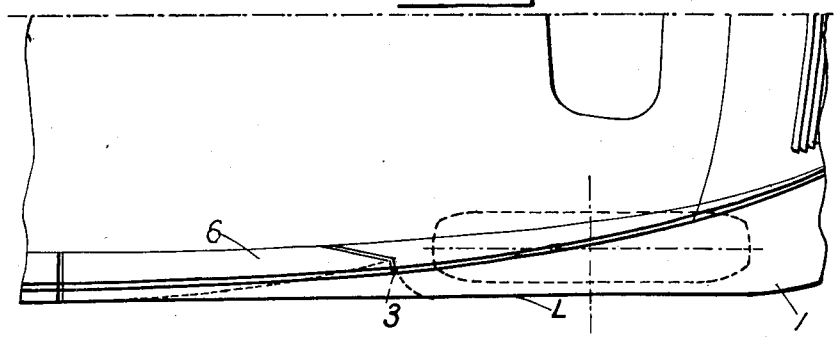
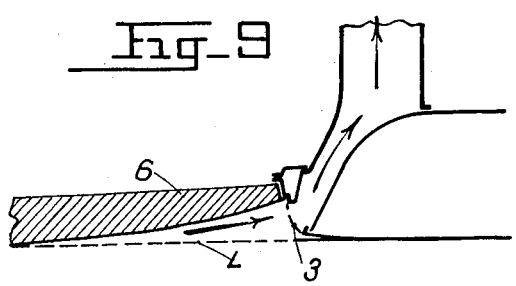

2,731,098

REAR DOOR AND FENDER AIR INLET PATH TO REAR ENGINE COMPARTMENT

Leon Saives, Billancourt, France, assignor to Regie Nationale des Usines Renault, Billancourt, France Application November 21, 1952, Serial No. 321,791

Claims priority, application France November 30, 1951

1 Claim. (Cl. 180—54)

This invention relates to the bodies of motor vehicles having the engine at the back, and relates more particularly to improvements in these bodies enabling the rear fender to be incorporated in the body and the rear door to be arranged in such a way as to create a free inlet for air through the rear fender to cool the radiator, or the engine when the latter is air-cooled. The improvements consist in pressing the rear fender with the side panel of the body, the fender panel not being completely closed at the front and having a free aperture for the intake of air, which is also facilitated by pressing the lower part of the rear door in such a way as to guide the air streams towards the fender aperture.

The invention relates to the combination of the rear fender with an aperture at the front incorporated in the body and the rear door pressed at the bottom to guide the air streams.

Specific embodiments of the invention will now be given by way of example with reference to the accompanying drawing, in which:

Figure 1 is a side view of the back portion of the body of a vehicle with a rear engine, according to the invention;

Figure 2 is a half-plan view of the vehicle body shown in Figure 1;

Figures 3 and 4 are cross-sections following the lines 3—3 in Figure 1 and 4—4 in Figure 2 respectively;

Figure 5 is a similar view to that in Figure 1 showing a variation in the construction;

Figure 6 is a half-plan view of the body in Figure 5;

Figures 7, 8 and 9 are cross-sections along the lines 7—7, 8—8 and 9—9 respectively in Figure 5.

Referring to the drawing, and particularly to Figures 1 and 2, it will be seen that the rear fender 1 is incorporated in the side panel 2, a solution which has been adopted in many body designs. In the arrangement according to the invention, the incorporated fender 1 is open in the front at 3 so as to form an air inlet, through which aperture the air enters suitable ducts 4—4¹, which lead it towards the part to be cooled, situated at the back under the bonnet 5, the engine if it is air-cooled, or the radiator of a water-cooled engine. The formation of incorporated fenders, that is to say integral with the body, which are open at the front, makes it possible to obtain bodies which are wider at the back in comparison with bodies having separate fenders, and which are therefore more comfortable, while the fact that the fender is open at the front simplifies the pressing of the fender.

The aperture 3 provided in the front part of the fender makes it possible to obtain a free intake of air in sufficient quantity to obtain satisfactory cooling of the part to be cooled.

To facilitate still further the entrance of the air through the aperture in the fender, the rear door 6 has a counter-pressing 7, the profile of which is to some extent an extension in the door of the profile of the rear fender, thus improving the aesthetics of the arrangement. This depression 7, provided in the door, directs the current of air caused by the movement of the vehicle into the aperture 3 of the fender. The air intake thus caused is not checked by any part of the body, as can be seen by a study of Figure 9; the arrows indicate the path followed by the air.

The construction in Figures 5, 6, 7, 8 and 9 shows a body in which the rear fender 1 has characteristics identical to those in Figures 1 and 2, but in which the door 6 no longer has a depression the contour of which is an extension of the profile of the fender.

In order to guide the air streams, the lower part of the door is pressed or shaped in such a way that the surface EFGH links up with the air intake in the front face of the fender, which has the same width as in the first arrangement in Figures 1 and 2.

It should be noted that with this second arrangement the part of the door situated above EF is flush with the rear fender and the front door, since, in its widest part, the body follows the line L (Figure 9) from one end of the vehicle to the other.

I claim:

In a motor vehicle having a body and an engine mounted in the rear portion of said body, said body having rear side panels enclosing said engine and integral fenders formed therewith for shielding the rear wheels of the vehicle, rear doors having their rear edges directly forward of said rear fenders, means providing air inlets at the forward end of said fenders for receiving air to be supplied to said engine, and the rear doors each being formed with a depression extending from the rear edge of the door to a point substantially forwardly of said rear edge, said depression being tapered inwardly from its forward edge to define a confined air scoop in said door directly forward of the associated air inlet.

References Cited in the file of this patent

UNITED STATES PATENTS

| | | |
|---|---|---|
| 2,127,409 | Klavik | Aug. 16, 1938 |
| 2,585,220 | Brezek | Feb. 12, 1952 |

FOREIGN PATENTS

| | | |
|---|---|---|
| 845,791 | France | May 22, 1939 |
| 874,341 | France | Apr. 27, 1942 |
| 919,413 | France | Nov. 25, 1946 |
| 957,352 | France | Aug. 22, 1949 |